United States Patent [19]
Singer

[11] Patent Number: 6,158,231
[45] Date of Patent: Dec. 12, 2000

[54] TEMPERATURE REGULATING SYSTEM EMPLOYING THERMOSTATIC SWITCHING DEVICES TO ASSURE SAFE OPERATION OF THE SYSTEM IN BOTH HAZARDOUS AND NON-HAZARDOUS APPLICATIONS

[76] Inventor: Jan L. Singer, 2519 S. Alder St., Philadelphia, Pa. 19148

[21] Appl. No.: 09/395,496

[22] Filed: Sep. 14, 1999

[51] Int. Cl.[7] .................................................. F25D 17/02
[52] U.S. Cl. ........................... 62/201; 137/340; 165/172; 165/219; 236/24.5; 236/25 R; 236/26 R; 237/8 A
[58] Field of Search .............................. 62/201; 137/340; 165/172, 218, 219; 236/24.5, 25 R, 26 R; 237/8 A

[56] References Cited

U.S. PATENT DOCUMENTS

| | | |
|---|---|---|
| 165,550 | 6/1875 | Dietz . |
| 206,357 | 7/1878 | Rogers . |
| 787,356 | 4/1905 | Collins . |
| 1,960,866 | 5/1934 | Chadwick ................................. 137/78 |
| 3,384,155 | 5/1968 | Newton ...................................... 165/2 |
| 3,407,835 | 10/1968 | Rolfes ..................................... 137/340 |
| 3,425,485 | 2/1969 | Newton ..................................... 165/22 |
| 3,536,131 | 10/1970 | Ivers ........................................ 165/22 |
| 4,100,964 | 7/1978 | Gorchev et al. ........................... 165/40 |
| 4,257,556 | 3/1981 | Skala .......................................... 237/7 |
| 4,279,270 | 7/1981 | Francis, Jr. .............................. 137/340 |
| 4,421,136 | 12/1983 | Aubert ..................................... 137/340 |
| 4,798,239 | 1/1989 | Persohn ...................................... 165/45 |
| 5,368,063 | 11/1994 | Kida ......................................... 137/340 |
| 5,715,869 | 2/1998 | Patterson .................................. 138/35 |
| 5,839,655 | 11/1998 | Iritani ..................................... 237/8 A |

*Primary Examiner*—William Doerrler
*Assistant Examiner*—Marc Norman
*Attorney, Agent, or Firm*—Volpe and Koenig, P.C.

[57] ABSTRACT

An energy control and transmission system which monitors temperature in piping systems, electronic systems and the like. Energy in the form of a heated or chilled fluid is delivered to the devices and/or regions of interest to maintain temperature conditions thereat within a safe range of values. Electrical energy employed in the system is confined to the location from which the fluid is pumped, eliminating the presence of electricity in hazardous or dangerous areas. Non-electrical temperature indicators are utilized to permit branching flow of the temperature controlling fluid from a closed loop responsive to detection of a temperature condition outside of the desired range of values. The opening of such a branching path triggers operation of a pressure sensitive switch which activates a pump for delivery of the temperature controlling fluid. The branching paths, in addition to being selectively coupled to the main delivery loop by independent temperature control valves, may also be controlled to achieve different, independent safe temperature ranges.

10 Claims, 2 Drawing Sheets

TEMPERATURE REGULATING SYSTEM EMPLOYING THERMOSTATIC SWITCHING DEVICES TO ASSURE SAFE OPERATION OF THE SYSTEM IN BOTH HAZARDOUS AND NON-HAZARDOUS APPLICATIONS

FIELD OF THE INVENTION

The present invention relates to temperature control systems and more particularly to systems for maintaining temperatures at various devices and/or regions through the use of controls which significantly enhance the safety of the system through the use of non-electrical instruments and controls.

BACKGROUND OF THE INVENTION

A number of applications exist wherein it is desirous of protecting devices and/or regions from certain temperature extremes. As one example, pipes carrying water and are subjected to ambient climatic conditions are often required to be heated or otherwise have their temperatures elevated to prevent their contents from freezing. One conventional technique is the utilization of heated wires wrapped about the conduits or other like pipes to prevent their contents from freezing.

The overriding concern in such systems is the prevention of electrical shock and/or short circuit conditions.

It is thus important to provide a system which will protect the contents of pipes and the like from freezing while at the same time eliminating the need for providing electrical energy in the immediate vicinity of the pipes being protected.

In addition, it is also important to provide selective protection in accordance with the specific conditions encountered at each location, which conditions may be significantly different from one another.

BRIEF DESCRIPTION OF THE INVENTION

The present invention is characterized by comprising a system which, in one preferred embodiment, is comprised of a source of a fluid maintained at an elevated temperature and moveable through a closed loop path, the fluid moving in the closed loop path being branched off responsive to a temperature sensor for delivering the pressurized fluid to a region requiring a temperature adjustment for protective reasons. For example, the branch path may be comprised of a flexible conduit wrapped around a fluid carrying conduit, the flexible conduit carrying fluid at an elevated temperature, for example, to prevent the fluid in the conduit being temperature controlled, such as water, from freezing. In other applications, it should be understood that a reverse arrangement may be used, i.e., the fluid being branched off may be of a lower temperature than the conduit it surrounds to retain the contents of the pipe about which it is wrapped from raising above a given temperature.

In the first mentioned embodiment, fluid is heated at a central location such as, for example, by way of a hot water heater. A local non-electrical/non-electronic sensor, which operates a mechanical valve, closes the valve when detecting normal temperature conditions, which increases the pressure in the line causing a localized pressure switch in the vicinity of the heated water source to open, disconnecting the electrical supply from a circulator pump. Upon an indication that the temperature is in an unsafe range, for example, below a temperature below which a liquid freezes, the sensor opens the valve, automatically reducing pressure in the line. Upon detection of a pressure drop, a local pressure switch couples electrical power to the circulator pump providing a heated liquid through the tubing to maintain the conduit carrying the liquid at a safe temperature and to prevent freezing. The tubing carrying the temperature adjusting fluid is preferably either aligned along the exterior of the conduit being protected, or alternatively, may be wrapped therearound, or a combination thereof. Insulation may also be wrapped about the exterior of the tubing and conduit to retain the heat (or cold) generated therein.

The above-identified preferred embodiment provides a high level of safety not heretofore capable of being obtained through systems using electrically heated wires wrapped about a conduit to be protected.

In another preferred embodiment, a plurality of branch networks may be selectively fluid coupled to the main loop through independent thermostatically controlled mechanical valves, each of which operating independently of the other and capable of being operated at different temperature control levels, if desired.

OBJECTS OF THE INVENTION

It is therefore one object of the present invention to provide a novel temperature control system providing temperature protection for a conduit or region, for example, through the use of a control system, which provides a high degree of safety in the regions where the control is being exercised by means of a design which eliminates the use of both electric/electronic sensors and electric power to the region being protected.

Another object of the present invention is to provide a temperature protection system which maintains safe temperatures in conduits, regions and the like, while eliminating the need for electronic heating and/or temperature monitoring systems and the attendant danger that they create.

Still another object of the present invention is to provide a novel temperature control system utilizing thermostatically controlled mechanical valves for controlling the flow of a fluid to a conduit or region being protected.

BRIEF DESCRIPTION OF THE FIGURES

The above, as well as other objects of the present invention, will become apparent when reading the accompanying description and drawings, in which.

DETAILED DESCRIPTION OF THE INVENTION AND PREFERRED EMBODIMENTS THEREOF

Figure 1:
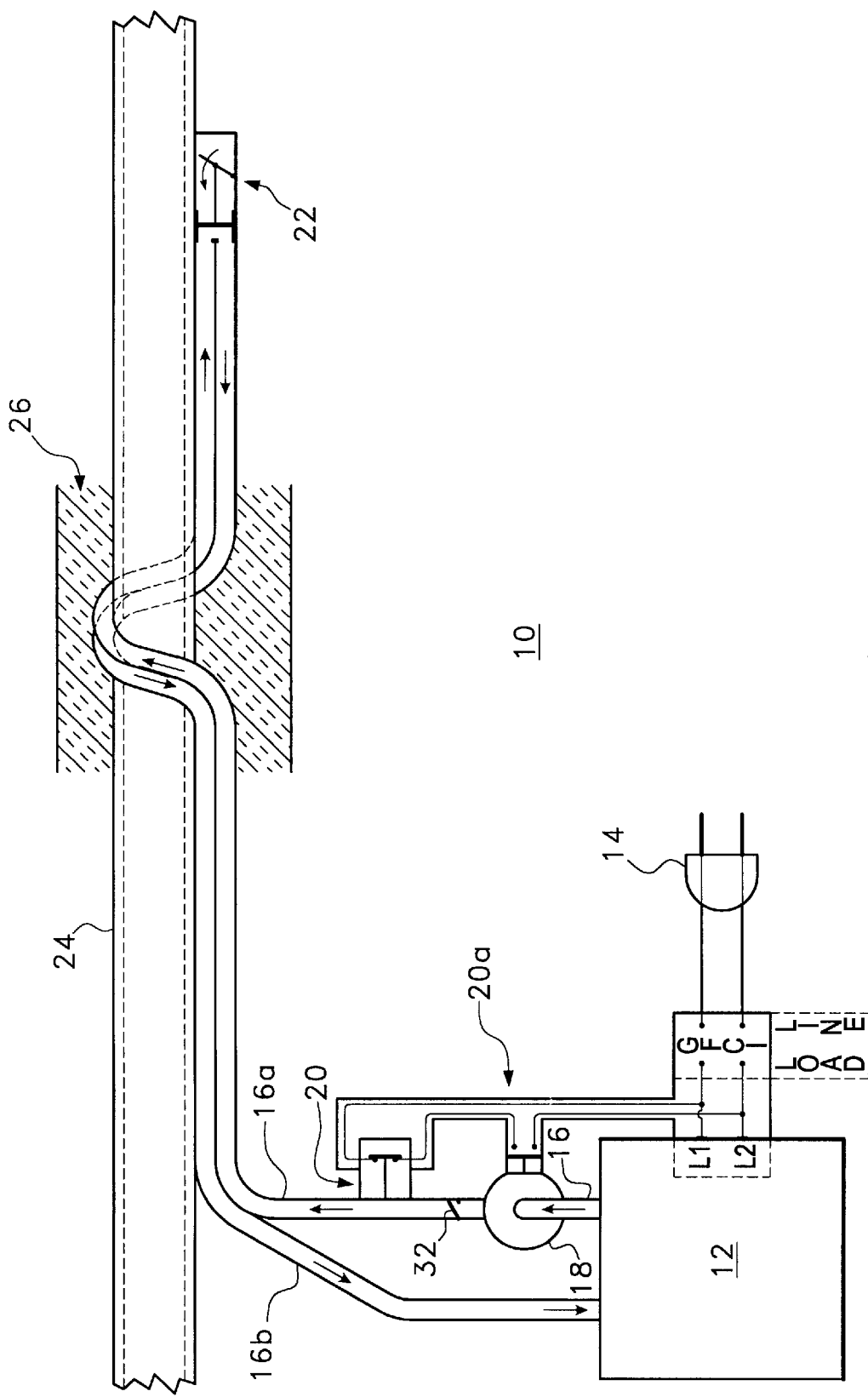
FIG. 1 is a schematic diagram showing one preferred embodiment of the present invention.

FIG. 1 shows a temperature control system 10 designed in accordance with the principles of the present invention and being comprised of a source 12 for heating a liquid. In the preferred embodiment, the source 12 may be a hot water heater for heating water to a predetermined level. The hot water heater is coupled to a suitable electrical supply source through a coupling 14. The hot water heater is coupled to a closed loop of tubing comprising a first tubing run 16 coupled to an outlet of the hot water heater. A circulator pump 18, when energized, pumps water through tubing run 16 into tubing 16a. A single-pole pressure-operated switch 20 senses pressure in tubing section 16a and is designed to close electrical switch 20a, coupling electrical power to the circulator pump 18, when the pressure level in tubing 16a drops below a predetermined level.

Tubing run 16a extends to a temperature actuated mechanical valve 22 which selectively couples and decouples tubing run 16a with (from) tubing run 16b which returns to the input end of hot water heater 12. The valve assembly may employ a sensing sub-assembly having a bimetal structure or other temperature sensitive device which converts temperature into mechanical energy (i.e., movement). Tubing runs 16a and 16b are either arranged in close proximity to conduit 24 whose contents are to be temperature protected, or alternatively, may be wrapped about conduit 24. The arrangement of either being adjacent and parallel to or wrapped about conduit 24 one or more times is dependent upon the particular application. In addition, insulation 26 may be wrapped about the conduit 24 and tubing runs 16a and 16b to retain the heat being generated therein and prevented from escaping.

In operation, let it be assumed that ambient temperature is such that the liquid flowing through conduit 24 (represented by arrow A) is not in danger of freezing. At this time, temperature-activated mechanical valve 22 is closed. Pressure operated switch 20 opens on a rise in temperature. Temperature-activated mechanical valve 22 shuts tubular run 16a, turning off the circulator pump 18.

When the temperature drops to a dangerous level, temperature-actuated mechanical valve 22 opens, causing a drop in pressure in tubular run 16a. This causes pressure switch 20 to close, activating circulating pump 18, causing the heated fluid to flow through tubular runs 16 and 16a and past open valve 22 and through run 16b, to return to the hot water heater 12, thereby controlling the temperature and, in the case of heated water being provided, protects the contents of conduit 24 from freezing.

Figure 2:
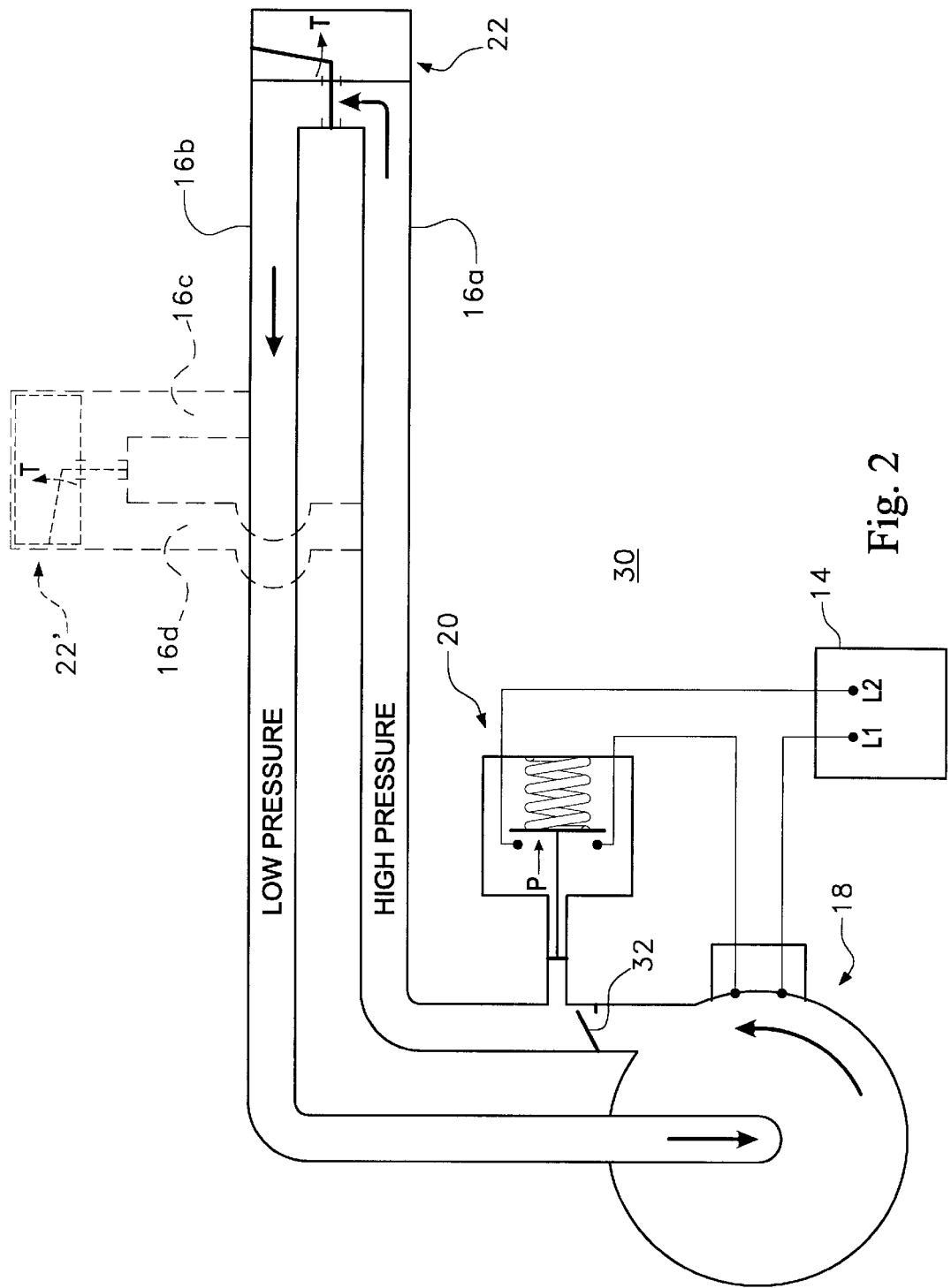
FIG. 2 is a schematic diagram showing another preferred embodiment of the present invention.

FIG. 2 shows another alternative embodiment 30 of the present invention in which like elements are designated by like numerals, as between FIGS. 1 and 2.

As in FIG. 1, the embodiment 30 comprises a pump 18 coupled to high pressure tubular run 16a. The downstream end of tubular run 16a is selectively coupled to the upstream end of tubular run 16b, which returns fluid to the source, by thermostatically-controlled mechanical valve 22. Pressure-actuated switch 20 selectively couples pump 18 to power source 14. A check valve 32 operates to prevent pressurized fluid from being returned to pump 18 through tubular run 16a.

The operation of the embodiment 30 is substantially the same as the operation of the embodiment 10 wherein the downstream end of tubular run 16a is closed by thermostatically-controlled mechanical valve 22 when ambient temperature, detected by thermostatically controlled mechanical valve 22, is at a safe level. The pressure in tubular run 16a causes pressure switch 20 to open, decoupling power source 14 from pump 18. When the temperature drops to an unsafe level, thermostatically-controlled mechanical valve 22 opens, causing a pressure drop in tubular run 16a which is detected by pressure switch 20, which then closes to couple the power source to pump 18, delivering a heated (or, in an alternative, a cooled) liquid to the region of the conduit being protected.

If desired, a plurality of optional, additional, thermostatically controlled mechanical valves, such as the valve 22', may be coupled across the low and high pressure tubular run 16a, 16b. This additional parallel branching fluid network operates in the same manner in that, when the conduits 16c and 16d are at an ambient temperature, which is at a safe level, the thermostatically controlled mechanical valve 22' closes, preventing fluid from flowing through branch 16c to branch 16d. The high pressure level detected by pressure switch 20 prevents pump 18 from operating in the same manner as was previously described.

When ambient temperature monitored by thermostatically controlled mechanical valve 22' drops to an unsafe level, valve 22' opens causing a pressure drop in tubular run 16a, 16c, which is detected by pressure switch 20 to activate pump 18.

Additional branches may be provided depending upon the particular applications. Also, as was mentioned hereinabove, the fluid delivered may be a chilled liquid, as well as a heated liquid, which is pumped through a coil or coils surrounding a conduit or, for example, a condenser in which cooled or chilled air is provided to a region whose temperature is controlled so as not to be elevated above a given unsafe upper temperature level.

The present invention is characterized by providing temperature protection while eliminating conventional electrical heating devices, as well as eliminating the need for electrical sensing devices and the need to provide electrical power to such sensing devices at remote areas, which present a hazardous condition and thus lack the safety of the present invention.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A system for regulating a temperature within a given region while protecting said region from the danger of an electric shock or short circuit comprising:

a source of conductive temperature control fluid;

a pump for pumping said fluid;

closed loop tubing for circulating the temperature controlling fluid about a loop including said pump, said close loop tubing including a high pressure tubular run coupled between an outlet of said pump and a remote point and a low pressure tubular run coupled between said remote point and the return of said pump said remote point being within said region and being exposed to ambient conditions present in said region; and a thermostatically-controlled mechanical valve assembly coupling a downstream end of said high pressure tubular run to an upstream end of said low pressure tubular run for monitoring temperature at said remote point to close said valve when a safe ambient temperature is present and open said valve when an unsafe temperature condition is present said mechanical valve assembly protecting said remote point from electrical shock or short-circuit; and a pressure actuated switch activating said pump when a drop in pressure in detected and deactivating said pump when a rise in pressure is detected.

2. The system of claim 1 wherein said temperature regulating fluid comprises water;

a liquid chilling unit for chilling said water to a predetermined level.

3. The system of claim 1 wherein at least one additional pair of branch tubular runs each have one of their ends coupled to one of said high pressure and low pressure tubular runs and selectively coupled together through a second thermostatically-controlled valve assembly designed to couple the first and second tubular branches to one another when an unsafe temperature level is present and for decoupling said tubular branch members from one another when a safe temperature level is present.

4. A system of claim 3 wherein at least one of said branch tubular members is arranged to temperature control a region.

5. A system of claim 3 wherein at least one of said branch tubular members is arranged to temperature control a conduit carrying a fluid, at least one of said branch tubular runs being positioned in close proximity to said conduit.

6. The system of claim 1 wherein a plurality of pairs of branch tubular runs each have one of their ends coupled to one of said high pressure and low pressure tubular runs and selectively coupled together through a second thermostatically-controlled valve assembly designed to couple the first and second tubular branches to one another when an unsafe temperature level is present and for decoupling said tubular branch members from one another when a safe temperature level is present.

7. A system according to claim 6 wherein each thermostatically-controlled valve assembly is independently set to operate at a temperature level which is a function of the safe temperature level in the region being protected.

8. A system for regulating a temperature within a given region comprising:

a source of temperature control fluid;

a pump for pumping said fluid;

closed loop tubing for circulating the temperature controlling fluid about a loop including said pump, said close loop tubing including a high pressure tubular run coupled between an outlet of said pump and a remote point and a low pressure tubular run coupled between said remote point and the return of said pump; and a thermostatically-controlled valve assembly coupling a downstream end of said high pressure tubular run to an upstream end of said low pressure tubular run for monitoring temperature at said remote point to close said valve on a safe ambient temperature is present and open said valve when an unsafe temperature condition is present;

said pressure actuated switch activating said pump when a drop in pressure in detected and deactivating said pump when a rise in pressure is detected said region being temperature regulated comprising a conduit carrying a fluid; and at least one of said tubular runs being placed adjacent to said conduit for conveying a temperature condition determined by the fluid in said tubular run to said conduit.

9. The system of claim 8 wherein said tubular run is looped about said conduit.

10. The system of claim 8 wherein insulation means is wrapped about said tubular run adjacent said conduit to retain the temperature level being conveyed to said conduit by said tubular run.

* * * * *